Figures 1, 2, 3, 4, 5:
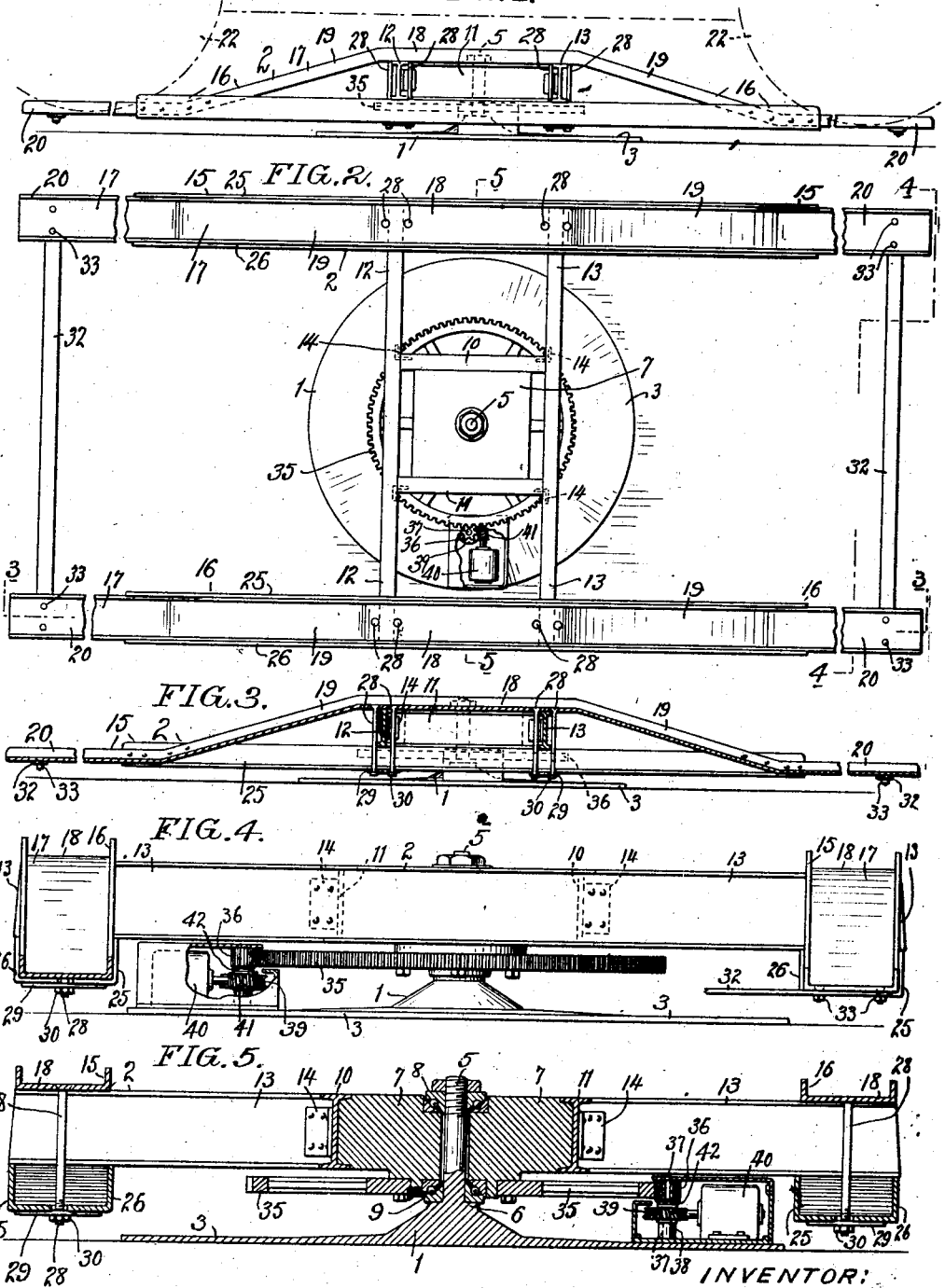

Aug. 30, 1927.

A. L. CRESCI 1,640,982

TURNTABLE

Original Filed June 10, 1924

INVENTOR:
Anthony L. Cresci
By F. DeWitt Goodwin
Attorney

Patented Aug. 30, 1927.

1,640,982

UNITED STATES PATENT OFFICE.

ANTHONY L. CRESCI, OF VINELAND, NEW JERSEY.

TURNTABLE.

Application filed June 10, 1924, Serial No. 719,031. Renewed July 2, 1927.

My invention relates to improvements in a turn-table adapted for display purposes. The object of my invention is to provide a turn-table suitable for displaying an automobile or other merchandise in a show room or window; a further object is to construct a turn-table adapted to be rotated slowly for displaying the merchandise and providing suitable mechanism for rotating the same; a further object is to construct a turn-table in detachable sections making it portable, and adapted to be readily taken apart and assembled for shipping purposes; a still further object is to construct a turn-table having a substantial base and a central bearing which will support the turn-table in a balanced position without securing the base to the floor; a still further object is to form the turn-table of structural frame work which is light in weight and sufficiently rigid to support a heavy automobile or truck, and a still further object is to construct the turn table with a relatively high central portion and relatively low down supporting track sections adapted to carry a vehicle in a position close to the floor thus providing ample room for the central bearing and rotating mechanism.

Referring to the accompanying drawing, Fig. 1, is a side elevation showing my improved turn-table, and indicating in dotted lines an automobile thereon; Fig. 2, is a plan view of Fig. 1; Fig. 3, is a longitudinal vertical section, on line 3—3 Fig. 2; Fig. 4, is a transverse vertical section on line 4—4, Fig. 2, drawn on a larger scale; and Fig. 5, is a transverse vertical section on line 5—5 Fig. 2, drawn on a larger scale.

Referring to the accompanying drawings, in which like reference characters refer to like parts, 1 represents a base and 2 represents the turn-table rotatably mounted upon said base. The base 1 consists of a large flange 3, adapted to rest upon the floor, without being secured thereto. Centrally positioned upon the flange 3 is an upright shaft 5, having a shoulder 6 upon which is rotatably supported the central bearing block 7 of the turn-table.

Ball bearings 8 and 9 are interposed between the shift 5 and said block 7 to reduce the friction and permit of an accurate adjustment for holding the turn-table in a horizontal plane. The top of the shaft 5 and the bearing block 7 are elevated, as much as the free space under an automobile will permit, thus allowing the ball bearings 8 and 9 to be widely separated so as to support the turn-table in a horizontal plane, without tilting sufficiently to scrape the floor when revolving, thus eliminating the use of a circular track heretofore required.

The bearing block 7 is rigidly secured between parallel I-beams 10 and 11, which latter are secured to cross-pieces, or I-beams, 12 and 13 by angle-plates 14, thus forming a rigid rectangular bearing frame unit, which is detachably mounted upon the base 1 and to which are detachably secured the track units of the turn-table, hereafter described.

The track units 15 and 16, each consist of a track 17, formed of channel iron, which extends the entire length of the turn-table. Each track 17 is bent, as shown in Figs. 1 and 3, thus forming an elevated central section 18, inclined sections 19 and horizontal supporting end sections 20, which latter are positioned close to the floor. The wheels 22 of the automobile may be run over the elevated sections 18 of the tracks and brought into a balanced position upon the end sections 20, as indicated in dotted lines Fig. 1. The opposite end sections 20 of each track 17 are connected by two relatively heavy angle-irons 25 and 26. The ends of each angle iron are rigidly secured to the end sections 20 of the channel iron forming the track 17. Said track 17 and said two angle irons 25 and 26, are thus rigidly secured together and form a rigid truss construction adapted to be supported centrally and carry the weight of a heavy load upon the supporting end sections 20 of the track.

The track units 15 and 16 are adapted to be detachably secured upon the ends of the cross-pieces or I-beams 12 and 13, by bolts 28, positioned on opposite sides of each of said cross-pieces. Said bolts 28 have counter-sunk heads located in the elevated central portion 18 of the track 17, and the lower ends of said bolts pass through the space between the adjacent edges of the angle-irons 25 and 26, and also pass through holes in the clamp plates 29. By tightening the nuts 30 on said bolts the I-beams 12 and 13 may be tightly clamped between the elevated sections 18 of the tracks and the top edges of the angle-irons 25 and 26.

The extreme ends of opposite track units are secured together in spaced relation by cross-bars 32, detachably secured by bolts 33 to said tracks. By removing the bolts 33 and 28, each track unit may be detached from the rectangular bearing frame unit formed by the bearing block 7 and the members 10, 11, 12 and 13.

The cross-pieces 12 and 13 of the bearing frame unit are spaced a sufficient distance apart to permit the track units to be rigidly secured to said bearing frame unit and thus insure the track units against any vertical or tilting movement.

The mechanism for rotating the turn-table comprises a gear wheel 35, secured to under side of the bearing block 7, and a pinion 36 meshing with said gear 35. The pinion 36 is carried upon a shaft 37 mounted in a bearing 38, secured upon the base flange 3. A worm-wheel 39 is also mounted upon said shaft 37 and is rotated by a motor 40 through a worm 41 meshing with the worm-wheel 39. A friction clutch 42, of any standard type is interposed between the worm wheel 39 and the pinion 36, adapted to relieve the motor from a sudden strain when starting the turn table in motion.

The operation of my invention is as follows: The motor vehicle is run upon the tracks of the turn-table by first placing inclined blocks, or skids, under the ends of the tracks to support the same under the unbalanced strain. The front, or rear, wheels of the vehicle are run over the inclined and elevated sections of the tracks so that the vehicle may be placed in a balanced position on the turn-table, as indicated in Fig. 1. The motor 40 is then started and the power is applied through the rotating mechanism for slowly rotating the turn-table. By means of the ball-bearings and the rigid pivot shaft the turn-table, with a heavy vehicle thereon, may be slowly and continuously rotated by a very small electric motor. The central bearing, having two widely separated points of support upon a relatively long upright shaft, arranged as shown in the drawing, will hold the turn table in a horizontal plane, so that the weight of a person stepping into or out of an automobile mounted on the turn-table will not tilt the latter. The necessity of using a circular supporting track is thus avoided. By constructing the turn-table in detachable units the same may be readily transported. Any other line of merchandise may be displayed upon the turn table without departing from my invention.

I claim:—

1. A turn-table adapted for supporting a vehicle comprising a base, a central supporting frame rotatably mounted upon said base, track units supported upon opposite portions of said central frame, said track units each forming a rigid truss structure having low track sections and a relatively higher central section adapted to give rigidity to the track unit throughout its length.

2. A turn-table adapted for supporting a vehicle comprising, a base, adapted to rest upon a floor, a rigid bearing frame rotatably mounted upon the base, track units supported upon said frame, said track units each comprising end wheel-supporting-sections positioned relatively close to the floor level and an elevated central section rigidly braced together to form a truss construction adapted to support said vehicle upon said end sections of the tracks.

3. A turn-table adapted for supporting a vehicle comprising a base, a central supporting frame rotatably mounted upon said base, track units supported upon opposite ends of said frame, each track unit comprising, a track having end section arranged in alignment, an elevated central section, inclined sections between said end sections and said central section, and a rigid brace member rigidly secured between said end sections.

4. A turn-table adapted for supporting a vehicle comprising, a base, a central supporting frame rotatably mounted upon said base, track units supported upon opposite sides of said frame, each track unit comprising a track formed of a continuous member having an elevated central portion, relatively low end sections and a rigid brace member secured between said end sections for giving rigidity to the track unit.

5. A turn-table adapted for supporting a vehicle comprising, a base, a central supporting frame rotatably mounted upon said base, track units supported upon opposite sides of said frame, each track comprising a track formed of channel iron with upwardly turned edge flanges, said channel iron having an elevated central section and relatively low end sections, and angle plates having their opposite ends secured to the opposite end sections of said channel iron adapted for giving rigidity to the track.

6. A turn table adapted for supporting a vehicle comprising a portable self-supporting base adapted to rest upon the floor, an upright shaft secured in said base, a relatively thick bearing frame having an aperture formed therein through which said shaft extends, parallel tracks mounted upon outer opposite portions of the bearing frame adapted to support the vehicle, a bearing upon said shaft upon which said frame is rotatably supported, a collar upon said shaft located above the bearing frame, and means for adjustably securing said collar upon said shaft in spaced relation to said first mentioned bearing adapted for holding said bearing frame against tilting movement upon said shaft.

7. A turn table adapted for supporting a vehicle comprising, a portable self-supporting base adapted to rest upon the floor, an upright shaft secured in said base, a relatively thick bearing frame having an aperture formed therein through which said shaft extends, parallel tracks mounted upon outer opposite portions of the bearing frame adapted to support the vehicle, a bearing upon said shaft upon which said frame is rotatably supported, a collar having a conical surface thereon adapted to impinge against the upper portion of said frame, and means for adjustably securing said collar upon said shaft in spaced relation to said first mentioned bearing adapted for holding said bearing frame against tilting movement upon said shaft.

8. A turn table adapted for supporting a vehicle comprising a base adapted to rest upon a floor, an upright shaft secured to said base, a shoulder formed upon said shaft, a rectangular bearing block rotatably supported upon said shoulder, cross pieces secured to the vertical edges of the block forming a rigid supporting frame adapted to rotate about said shaft, tracks secured to the outer ends of said cross pieces adapted for supporting the vehicle wheels, a collar secured upon said shaft adapted to hold said block upon said shoulder thus preventing the block from tilting sufficiently to allow the tracks to strike the floor, and means operatively associated with said block adapted for rotating the same about said shaft.

In testimony whereof I affix my signature.

ANTHONY L. CRESCI.